US012609933B2

(12) United States Patent
Blanchet

(10) Patent No.: US 12,609,933 B2
(45) Date of Patent: Apr. 21, 2026

(54) METHOD FOR PROCESSING AN OPERATION INVOLVING SECRET DATA, TERMINAL, SYSTEM AND CORRESPONDING COMPUTER PROGRAM

(71) Applicant: BANKS AND ACQUIRERS INTERNATIONAL HOLDING, Suresnes (FR)

(72) Inventor: Jean-Bernard Blanchet, Paris (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 231 days.

(21) Appl. No.: 18/036,435

(22) PCT Filed: Nov. 12, 2021

(86) PCT No.: PCT/EP2021/081573
§ 371 (c)(1),
(2) Date: May 11, 2023

(87) PCT Pub. No.: WO2022/101437
PCT Pub. Date: May 19, 2022

(65) Prior Publication Data
US 2024/0022569 A1 Jan. 18, 2024

(30) Foreign Application Priority Data
Nov. 13, 2020 (FR) ...................................... 20/11627

(51) Int. Cl.
*H04L 9/40* (2022.01)
(52) U.S. Cl.
CPC .......... *H04L 63/10* (2013.01); *H04L 63/0876* (2013.01)

(58) Field of Classification Search
CPC ................. H04L 63/0876; H04L 63/10; H04L 2463/102; G06Q 20/382; G06Q 20/4012; G07F 7/0873; G07F 7/127; H04W 12/08
See application file for complete search history.

(56) References Cited

U.S. PATENT DOCUMENTS 10,049,349 B1 * 8/2018 Grassadonia .......... G06Q 20/40
10,366,378 B1 * 7/2019 Han ..................... G06Q 20/204
(Continued)

FOREIGN PATENT DOCUMENTS

WO 2015/059389 A1 4/2015

OTHER PUBLICATIONS

Gaber and Achemial. English Translation of WO2015059389A1. (Year: 2015).*

(Continued)

*Primary Examiner* — John M Macilwinen
(74) *Attorney, Agent, or Firm* — Oliff PLC

(57) ABSTRACT

A method for processing a transaction using a transaction device of a user, carried out within an electronic transaction terminal called a transaction terminal, and includes at least one connection interface for connecting to at least one communication network. Such a method includes: determining the availability of a communication network recorded in a secure memory space of the terminal; receiving an instruction to carry out a transaction; and selecting from an online transaction component and an autonomous transaction component, a transaction component to be activated in accordance with the communication network availability, the autonomous transaction component being activated when any communication network is unavailable, and carrying out the transaction by means of the activated transaction component, the transaction components using a root component which executes basic functions common to the two trans- (Continued)

action components, the functions of the root component being protected and only accessible when read by the transaction components.

9 Claims, 2 Drawing Sheets

(56) References Cited

U.S. PATENT DOCUMENTS

| | | | |
|---|---|---|---|
| 10,956,585 B2 * | 3/2021 | Ortiz | G06F 21/602 |
| 2005/0033688 A1 * | 2/2005 | Peart | G07F 7/127 |
| | | | 340/5.4 |
| 2013/0179281 A1 | 7/2013 | White et al. | |
| 2013/0185214 A1 * | 7/2013 | Azen | G06Q 20/20 |
| | | | 705/76 |
| 2016/0110718 A1 * | 4/2016 | Jajara | G06Q 20/4016 |
| | | | 705/44 |
| 2019/0130386 A1 * | 5/2019 | Bhat | G06Q 20/322 |

OTHER PUBLICATIONS

Sinha, Rohit, et al. "A design and verification methodology for secure isolated regions." ACM SIGPLAN Notices 51.6: 665-681. (Year: 2016).*
Brasser, Ferdinand, et al. "SANCTUARY: ARMing TrustZone with User-space Enclaves." NDSS. (Year: 2019).*
Jan. 31, 2022 International Search Report issued in International Patent Application No. PCT/EP2021/081573.
Jan. 31, 2022 Written Opinion issued in International Patent Application No. PCT/EP2021/081573.

* cited by examiner

METHOD FOR PROCESSING AN OPERATION INVOLVING SECRET DATA, TERMINAL, SYSTEM AND CORRESPONDING COMPUTER PROGRAM

1. Technical field

The disclosure relates to the field of computer security. More particularly, the disclosure relates to the security and my confidentialiFty of data processing within a secure processing terminal, such as a payment terminal or a terminal processing sensitive or personal data (biometric data, secret data).

2. Prior art

For many years, it has been common to have to use terminals whose purpose is to guarantee access to a good or service, Examples of terminals are, for example, payment terminals of the nomadic type, operating on a standalone power source and which can be used by a merchant during his activity (such nomadic terminals are commonly used by professional merchants in mobility, such as taxis, home nurses, is etc.). Other types of terminals can be, for example, identification (or authentication) terminals which are used to allow access to a good or a service (it can be, for example, terminals verifying, using an access card in the possession of a user, the ability of this user to access the good or service). Such terminals are present, for example, in business premises to allow access to them or even in secure premises, or even to allow in certain situations, access to specific tools or machines on production sites.

Nevertheless, the terminals in question have greatly evolved since their initial implementation. Several decades ago, particularly at the beginning of the implementation of terminals using personal identification cards, the latter were considered sufficiently secure not to require any particular control other than verification, within the terminal, that the data presented and entered by the user were adequate (It is, for example, PIN code validity checks). However, the means of fraud having progressed, it quickly became apparent that it was necessary to compare the data presented to the terminal with data present on one or more remote servers. It was therefore necessary to provide additional means of communication allowing the terminal to connect to one or more servers to validate the transaction to be carried out, whatever the nature of the transaction. Nowadays, the presence of a communication network is often essential to conduct the transaction. A large part of the transactions carried out use at one time or another a communication network to carry out one or more operations (data transmission, verification of data presented by the user, transmission of remote authorizations, etc.). However, the absence of a communication network must not be detrimental to the conduct of the transaction. As a result, modern terminals embed a large number of superabundant functionalities. This overabundance of functionalities leads to the need for ever more powerful components (microprocessors, memories, secure interfaces). Yet, on the one hand these components are expensive, and on the other hand they often need to be protected, both physically (to prevent a fraudster from modifying the behavior of the terminal), and at the level of the computer programs installed on one or several of these components (terminal operating programs or transaction management programs). These security constraints imply ever higher costs and ever longer and tedious maintenance operations for terminals and computer programs, even though the majority of operations carried out on the terminal do not really require the presence of such an overabundance of components and code. Thus, despite the frequent possibility of using a communication network (often of high performance), the potential absence of such a network is detrimental: it is always essential to expect this absence in the design of the terminal. This leads to a certain complexity of the operating software of this terminal, and therefore difficulties in maintaining and is updating it.

It is therefore necessary to have a solution which, on the one hand, is satisfactory from the point of view of the operation of the terminal, while guaranteeing the security of the transactions to be carried out and not involving maintenance operations that are too long, costly and complex.

SUMMARY OF THE INVENTION

The disclosure makes it possible to respond at least in part to the problems posed by the prior art. More particularly, the disclosure relates to a method for processing a transaction using a user's transactional device, method implemented within an electronic transactional terminal, called a transactional terminal, said transactional terminal comprising at least one connection interface to at least one communication network. Such a method comprises:

a step of determining, from at least one connection interface of the transactional electronic terminal, the availability of a communication network, recording, within a secure memory space of the terminal, at least one data of the communication network availability;

a step of receiving a command to implement a transaction; and a step of selecting, among an online transactional component and a standalone transactional component, a transactional component to be activated for the implementation of the transaction as a function of said at least one datum of communication network availability, the standalone transactional component being activated in the event of unavailability of any communication network, a step of carrying out the transaction by the activated transactional component.

The method implements a root component (R07), used respectively by the online transactional component (CTL) and the standalone transactional component (CTA), the root component (R07) comprising basic functions common to the two transactional components, the functions of said root component being protected and being accessible only in read mode by the online transactional component and the standalone transactional component.

Thus, it is possible to exclusively constrain the implementation of one or the other of the two transactional components, which can therefore have different operating logics depending on the availability or not of a communication network.

According to one particular characteristic, the step of carrying out the transaction by the activated transactional component comprises, when the online transactional component is implemented:

a step of loading, from a secure memory space, of the terminal, at least one parameter for implementing the online transactional component;

a step of establishing, with an intermediate transactional server, a secure communication channel, from said at least one parameter and from a secure link construction function available within the root component registered within a secure memory of the terminal;

a step of obtaining user data from the user's transactional device;

a step of transmitting, to the intermediate transactional server, via the secure communication channel, the user data;

a step of receiving, from the intermediate transactional server, a result of implementation of the transaction by the intermediate transactional server, the implementation of the transaction having been caused by the transmission of a user data;

a step of restituting, by the transaction terminal, the result of the implementation of the transaction by the intermediate transaction server.

Thus, it is possible to constrain the implementation of an online transaction when a communication network is available.

According to one particular characteristic, the method for processing a transaction further comprises:

a step of entering, by the user in possession of the transactional device, a personal identification code;

a step of encrypting, from a function for encrypting the authentication code available within the root component, the personal identification code entered by said user;

a step of transmitting, to the intermediate transactional server, via the secure communication channel, the encrypted personal identification code.

According to one particular characteristic, the step of carrying out the transaction by the activated transactional component comprises, when the standalone transactional component is implemented:

a step of loading, from a secure memory space, the terminal, one of the parameters for implementing the standalone transactional component;

a step of obtaining, from a transaction management function available within the root component recorded within a secure memory of the terminal and said at least one parameter, a condition for carrying out the transaction;

a step of obtaining user data from the user's transactional device;

when the condition for carrying out the transaction imposes the implementation of an online transaction, a step of rejecting the transaction by the standalone transactional component;

when the condition for carrying out the transaction authorizes the implementation of a transaction locally, a step of implementing the transaction;

a step of restituting, by the transaction terminal, the transaction implementation result.

Thus, it is possible to carry out, autonomously, the implementation of a transaction locally, even in the absence of a communication network.

According to one particular characteristic, the method further comprises:

a step of querying the user's transactional device delivering an additional condition for carrying out the transaction determined by the user's transactional device;

when the additional condition for carrying out the transaction imposes the implementation of an online transaction, a step of rejecting the transaction by the standalone transactional component;

when the additional condition for carrying out the transaction authorizes the implementation of a transaction locally, a step of implementing the transaction;

According to a particular characteristic, the method further comprises, when said at least one communication network availability datum indicates that a communication network is available:

a step of establishing, with an intermediate transactional server, a secure communication channel, from said at least one parameter and from a secure link construction function available within the root component registered within a secure memory of the terminal;

a step of transmitting, to the intermediate transactional server, a list of transactions previously carried out by means of the standalone transactional component;

According to another aspect, the disclosure also relates to a transactional electronic terminal, configured for the implementation of a transaction from a user's transactional device. Such a terminal comprises:

an online transactional component for implementing a transaction through an intermediary transactional server;

a standalone transactional component for the implementation of a transaction locally by the transactional electronic terminal;

means for determining, from at least one connection interface of the transactional electronic terminal, the availability of a communication network, recording, within a secure memory space of the terminal, at least one communication network availability datum;

means for receiving a command to implement a transaction; and means for selecting, among the online transactional component and the standalone transactional component, a transactional component to be activated for is the implementation of the transaction in said at least one communication network availability datum, the standalone transactional component being activated in the event of the unavailability of any communication network.

According to a particular characteristic, the online transactional component and the standalone transactional component have access to two separate memory areas of a secure memory space of the transactional electronic terminal, these two separate memory areas respectively comprising execution parameters of the online transactional component and parameters of the standalone transactional component.

According to another aspect, the disclosure also relates to a system for processing a transaction comprising at least one electronic terminal as described above and connected to an intermediate transaction server via a communication network.

According to a preferred implementation, the various steps of the methods according to the present disclosure are implemented by one or more software or computer programs; comprising software instructions intended to be executed by a data processor of an execution terminal according to the present technique and being designed to control the execution of the various steps of the methods, implemented at the level of the communication terminal, the electronic execution terminal and/or the remote server, within the framework of a distribution of the processing operations to perform and determined by a script source codes.

Consequently, the present technique also aims at programs capable of being executed by a computer or by a data processor, these programs including instructions for controlling the execution of the steps of the methods as mentioned above.

A program may use any programming language, and be in the form of source code, object code, or intermediate code between source code and object code, such as in partially compiled form, or in any other desirable form.

The present technique also aims at an information medium readable by a data processor, and including instructions of a program as mentioned above.

The information medium can be any entity or terminal capable of storing the program. For example, the medium may include a storage medium, such as a ROM, for example a CD ROM or a microelectronic circuit ROM, or else a magnetic recording medium, for example a mobile medium (memory card) or a hard drive or SSD.

On the other hand, the information medium can be a transmissible medium such as an electrical or optical signal, which can be conveyed via an electrical or optical cable, by radio or by other means. The program according to the present technique can in particular be downloaded from a network of the Internet type.

Alternatively, the information medium may be an integrated circuit in which the program is incorporated, the circuit being adapted to execute or to be used in the execution of the method in question.

According to one embodiment, the present technique is implemented by means of software and/or hardware components. From this perspective, the term «module» may correspond in this document to a software component, a hardware component or a set of hardware and software components.

A software component corresponds to one or more computer programs, one or more sub-programs of a program, or more generally to any element of a program or software capable of implementing a function or a set of functions, as described below for the concerned module. Such a software component is executed by a data processor of a physical entity (terminal, server, gateway, set-top-box, router, etc.) and is likely to access the hardware resources of this physical entity (memories, recording media, communication bus, electronic input/output cards, user interfaces, etc.).

In the same way, a hardware component corresponds to any element of a hardware assembly able to implement a function or a set of functions, according to what is described below for the concerned module. It can be a hardware component that can be programmed or has an integrated processor for executing software, for example an integrated circuit, a smart card, a memory card, an electronic card for executing a firmware, etc.

Each component of the system described above naturally implements its own software modules.

The different embodiments mentioned above can be combined with each other for the implementation of the present technique.

BRIEF DESCRIPTION OF DRAWINGS

Other characteristics and advantages will appear more clearly on reading the following description of a preferred embodiment, given by way of a simple illustrative and non-limiting example, and the appended drawings, among which.

DETAILED DESCRIPTION

Description of a General Embodiment

The general principle of the present technique is based on the implementation, within the processing terminal, of a different processing component depending on the presence, or not, of a communication network able to convey transaction is implementation data. One of the objects of the present technique is to allow the terminal to manage a transaction whatever the state of the communication network. Examples of terminals which can be modified to implement the described technique are, for example, nomadic-type payment terminals, operating on an independent power source and which can be used by a merchant during his activity. Other types of terminals can also be modified to implement the described technique are, for example, identification (or authentication) terminals which are used to allow access to a good or a service (it can be, for example, terminals verifying, using an access card in the possession of a user, the ability of this user to access the good or service). Such terminals are present, for example, in business premises to allow access to them or even in secure premises, or even to allow in certain situations, access to specific tools or machines on production sites.

As indicated above, the main problem with which these types of terminals are commonly confronted relates to the absence of an available or sufficient communication network to be able to conduct an online (payment, identification, authentication, authorization of access) transaction. To overcome the problems posed by the absence of networks or the inefficiency of the latter (insufficient flow, intermittent access), the inventors had the idea of modifying the electronic terminal to make it possible to ensure a simplified implementation of a transaction. The described technique therefore relates both to the architecture of the terminal and to the implementation of a transaction processing method.

Figure 1:
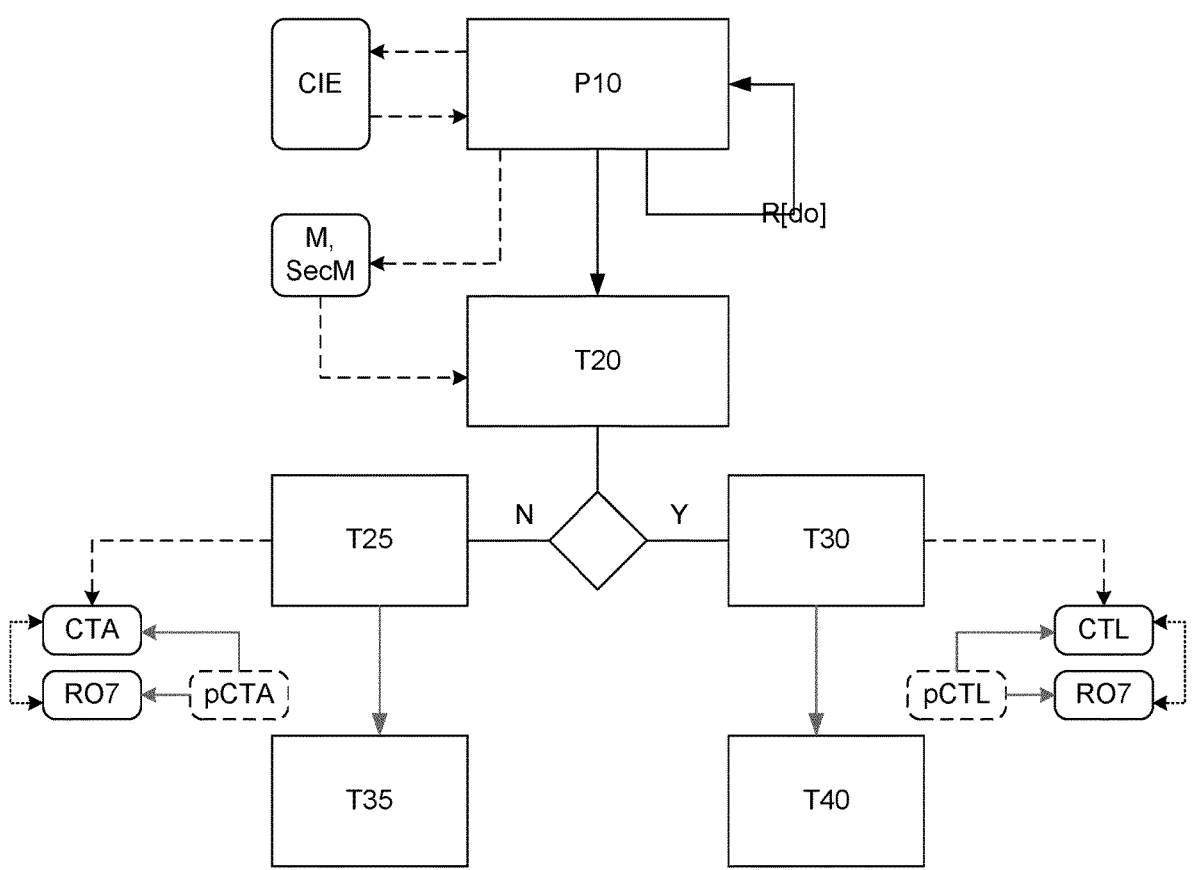
FIG. 1 exposes the steps of the method for processing a transaction.

As regards the implementation of the transaction, the method is described in relation to FIG. 1. Prior to the implementation of this method, the transaction terminal is powered up to perform a transaction. On power-up, the transaction terminal loads, from a secure memory, a set of programs allowing start-up (a memory is said to be secure when means restrict its access, such as for example hardware means restricting access and/or software means restricting access). This set of programs is cryptographically verified on startup. The read-only memory that comprises this set of programs is ideally secured in order to avoid any fraudulent modification of one or more programs of the set of programs when the terminal is switched off (turned off). When the terminal is started, a step of determining (P10) the availability of one or more communication networks is implemented. This determination step is implemented at least partially by a secure processing unit of the terminal. It comprises a step of measuring, from the network interfaces of the terminal (wireless networks, wired network, depending on the structure of the terminal), the presence of a signal representative of the availability of the network or networks. It also and/or alternatively comprises a step of obtaining one or more connectivity data (such as network connection addresses, data relating to the quality is of service offered by the network(s), latency data, etc. At the end of the implementation of this step, the terminal has, in a dedicated space of a secure memory (M. SecM), data representative of the availability/connection of a communication network, for each interface that can be used to do this. The determining step (P10) is implemented for example after starting and at least periodically (R[do]) once starting has been performed, to update the data representative of the availability/connection of a communication network in the dedicated space of the secure memory (M, Seal).

When a transaction must be carried out via the transaction terminal, a step (T20) of obtaining data representative of the availability/connection of a communication network is implemented by a launch component. This step consists of reading, within the dedicated space of the secure memory (M, SecM), the previously recorded data. When no communication network is available (case «N»), the launch component transmits (T25) an instruction to execute a standalone transactional component (CTA). The launch component can also launch itself (T25, same reference numeral) the implementation of the standalone transactional component (CTA). When a communication network is available (case «Y»), the launching component transmits (T30) an instruction to execute an online transactional component (CTL). The launch component can also launch itself (T30, same reference numeral) the implementation of the online transactional component (CTL). According to the invention, the standalone transactional component (CTA) and the online transactional component (CTL) do not share parameters in common. The parameters (pCTA, pCTL) necessary for the execution of each of the components (CTA, CTL) are stored separately in a secure memory parameter space (M, SecM). The standalone transactional component (CTA) does not have access to the execution parameters (pCTL) of the online transactional component (CTL). The online transactional component (CTL) does not have access to the execution parameters (pCTA) of the standalone transactional component (CTA). It is thanks to this parameter independence that the security of the terminal as modified by the present technique is partly ensured. The transaction is then carried out either locally by the standalone transactional component (T35), or via the online transactional component (T40).

The standalone transactional component (CTA) and the online transactional component (CTL) use a root component (R07). This component comprises implementations of basic functions. Thus, the root component (R07), whose functions are hardware and/or software protected (in a secure memory area, or by access using an encryption key available to each component) implements the basic functions, necessary to the two transactional components (CTA, CTL), the is components calling functions contained in this root component, to obtain one or more expected results. The two transactional components (CTA, CTL) are not able to modify these functions: they are read onlp and can only be invoked or called by the two transactional components (CTA, CTL), without modification. The parameters for calling and executing these basic functions are provided either by the standalone transactional component (CTA) or by the online transactional component (CTL) depending on the situation («Y» or «N»).

Finally, the two transactional components (CTA, CTL) do not implement the same functions: this means that for the execution of a transaction, the two transactional components (CTA, CTL) do not have the same implementation logic and do not implement, within them, identical functions. It is thanks to this difference in operation (i.e. not implementing the same functions) that the security of the terminal as modified by the present technique is also partly ensured.

More particularly, in general, the online transactional component (CTL) comprises:

a function for constructing, with a remote server, a secure point-to-point link;

a function for instructing the remote server to implement an online transaction;

a function for encrypting, within the terminal, data relating to the user of the terminal, in particular data entered/provided by the user and/or of one or more reference data contained within the user's transactional device (i.e, presented by the user, such as a badge, access card, transaction card, etc.);

a function for transmitting, to the remote server, data relating to the user in their encrypted form, a function which is independently or jointly implemented with a function of transmitting data relating to the terminal for the implementation of the online transaction; all of this data is necessarily transmitted, regardless of the fact of the theoretical obligation to conduct the online transaction: the use of an online transactional component (CTL) makes it necessary to transmit this data to an intermediate transactional server (STi);

a function for receiving, from the intermediate transactional server (Sti), data representative of the progress of the transaction carried out by the intermediate transactional server, in place of the terminal;

a function for transmitting, to the intermediate transactional server (Sti), data representative of transactions previously carried out by means of the standalone transactional component (CTA); this function is activated for example when starting the CTL component; it reads, within a (counting) register of the secure memory, a is counter of transactions implemented by the standalone transactional component (CTA); when the value contained in this register is greater than 0, it means that at least one transaction has been implemented by the standalone transactional component; in this case, the function carries out a sequential reading of a list of transactions and a transmission of the transactions which have been carried out by the standalone transactional component (CTA) during the absence of a network; the intermediate transactional server (Sti) acknowledges the receipt of these transactions; upon receipt of these acknowledgments, the online transactional component CTL changes the value of the reset register to the value 1. This passage makes it possible to indicate on the one hand that all the transactions in the list have been transmitted to the standalone transactional server (Sti) and that, during its next implementation, the standalone transactional component (CTA) can erase all of these transactions from its secure memory portion (see below): thus, the online transactional component does not act directly on the (portion of) secure memory of the standalone transactional component and vice versa. Moreover, the reset register may only be accessible by a specific function of the root component (R07), which alone has the ability to modify the value of this register at the request of the standalone transactional component (CTA) and of the online transaction component (CTL).

Thus, the online transactional component (CTL) allows eliminating the use of a traditional terminal (i.e. of the prior art) by carrying out in its place the operations necessary for the execution of the transaction. In this case, the terminal is no longer considered as a device for entering and transmitting/receiving data thanks to the use of this online transactional component (CTL).

More particularly, in general, the standalone transactional component (CTA) comprises:

- a function for comparing the data entered/provided by the user with one or several reference data contained within the transactional device presented by the user (access card, transaction card, etc.);
- a function for obtaining, from the transactional device presented by the user, data representative of a transaction conduct requirement by the transactional device (i.e. online transaction conduct/local transaction conduct);
- a functionality for rejecting the transaction, implemented when the transactional device presented by the user imposes the conduct of the transaction online;
- a functionality for storing data representative of the transaction when the transaction may be conducted locally by the standalone transactional component (CTA) (that is to say when the transactional device presented by the user does not require an online conduct); in this case, the transactions are added to the list of the transactions performed locally and the counting register is incremented each time a transaction is implemented by the standalone transactional component (CTA); the standalone transactional component adds the transactions performed as they are carried out; before carrying out a transaction, the standalone transactional component (CTA) performs a read, in secure memory, of the reset register. The value of this register is either 0 or 1 and allows the standalone transactional component (CTA) to determine whether the previous transactions of the list have already been transmitted to the intermediate transactional server (Sti) by the online transactional component on the occasion of a previous availability of a communication network: in which case, the standalone transactional component (CTA) changes the value of the counting register to 0 and the value of the reset register also to the value 0 and erases the list of the transactions; as indicated previously, the value of the reset register is modified by a call to a specific function of the root component.

Thus, as indicated previously, the online transactional component and the standalone transactional component do not share a common read-write memory area. The objective is to limit the possibilities of modifying the unauthorized data. Thus, for a given memory area of the secure memory (such as for example the area storing the list of the transactions performed by the standalone transactional component or the transaction counter), the online transactional component may only read this area, and not there make modifications. These modifications (erasing, writing) are only carried out by the standalone transactional component. This modification of the terminal allows to further increasing the security of the implementation of transactions.

Figure 2:
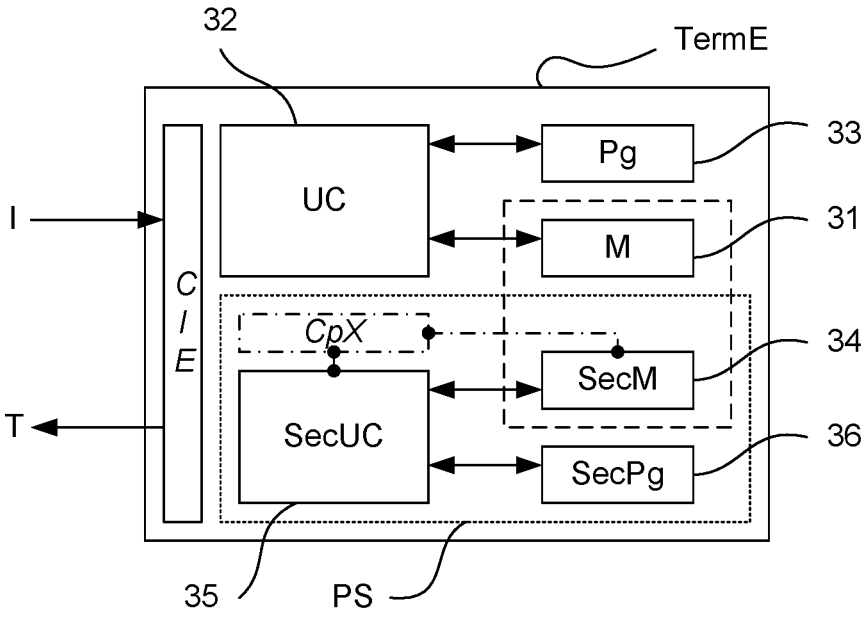
FIG. 2 illustrates the architecture of an electronic terminal.

In relation to FIG. 2, a simplified architecture of an electronic terminal (TermE) capable of performing the processing of a transaction as presented above is presented. An electronic terminal comprises a memory 31, a processing unit 32 equipped for example with a microprocessor, and driven by a computer program 33. The electronic terminal also comprises a secure memory 34, which may be merged with the memory 31 (as indicated in dotted lines, in this case the memory 31 is a secure memory), a secure processing unit 35 equipped for example with a secure microprocessor for physical protection measuring (physical protection around the chip, by mesh, vias, etc. and protection on the data transmission interfaces), and driven by a computer program 36 specifically dedicated to this secure processing unit 35, this computer program 36 implementing all or part of the method for processing a transaction as previously described. The group composed of the secure processing unit 35, the secure memory 34 and the dedicated computer program 36 constitutes the secure portion (PS) of the electronic terminal. In at least one embodiment, the present technique is implemented in the form of a set of programs installed in part or in whole on this secure portion of the transaction processing terminal. In at least one other embodiment, the present technique is implemented in the form of a dedicated component (CpX) capable of processing data of the processing units and installed in part or in whole on the secure portion of the transaction processing terminal. Furthermore, the terminal also comprises communication means (CIE) for example in the form of network components (WiFi, 3G/4G/5G, wired) which allow the terminal to receive data (I) from entities connected to one or several communication networks and transmit processed data (T) to such entities.

Such a terminal comprises, depending on the embodiments:

- means for obtaining data from transactional devices presented of the users (access card, transaction card, etc.; these means may be, for example, in the form of a smart card reader, or even NFC-type or RFID-type contactless card readers);
- entry means, allowing the user to enter one or several data for the implementation of the transaction, when necessary (physical input keyboard, screen, virtual input keyboard)
- means for processing the data obtained by the means for obtaining data from the transactional devices and means for processing the data entered by the users; these means are materialized for example in the form of a root component;
- means for processing a transaction; these means are materialized for example in the form of two independent components which are the online transactional component and the standalone transactional component;
- means for supplying data to one or several intermediate transactional servers;

As explained previously, these means are implemented through, for example secure, modules and/or components. They thus allow ensuring the security of the transactions carried out while guaranteeing a greater maintainability of the terminal.

Figure 3:
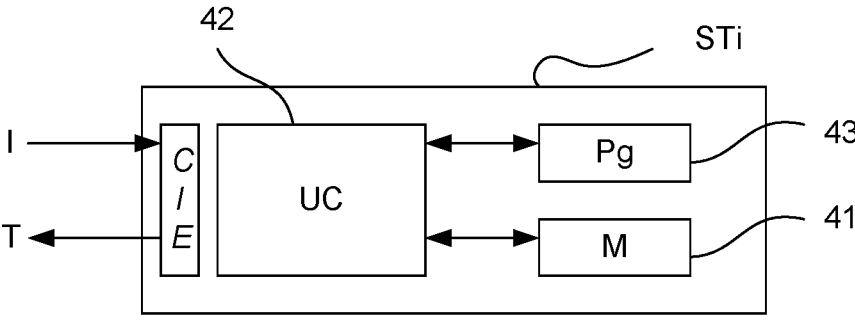
FIG. 3 illustrates the architecture of an intermediate transactional server.

In relation to FIG. 3, a simplified architecture of an intermediate transactional server (Sti) capable of performing the processing of a transaction as presented previously is presented. An intermediate transactional server (Sti) comprises a memory 41, a processing unit 42 equipped for example with a microprocessor, and driven by a computer program 43; Furthermore, the intermediate transactional server (Sti) also comprises communication means (CIE) being for example in the form of network components (WiFi, 3G/4G/5G, wired) which allow the intermediate transactional server (Sti) to receive data (I) from entities (transactional terminal, decision-making server) connected to one or several communication networks and transmit processed data (T) to such entities.

Such an intermediate transactional server (Sti) comprises, depending on the embodiments;

- means for obtaining data from electronic terminals as explained previously;
- means for constructing transactions based on the data from the electronic terminals; means for querying decision-making servers for the acceptance and/or refusal of the constructed transactions;

means for transmitting, to the terminals, transaction processing results.

DESCRIPTION OF A SPECIFIC EMBODIMENT

In this embodiment, the implementation of the method described previously at a payment terminal is presented; In this embodiment, it is assumed that the payment terminal comprises means for connecting to communication networks through one or several communication interfaces (Wifi, 3G/4G, etc.). In order to offer a greater transaction processing flexibility, the architecture of the payment terminal is modified. With these modifications, it is possible to implement the processing method previously described and adapted for a payment terminal. FIG. 2 describes the internal architecture of the payment terminal modified for the implementation of the processing method.

More specifically, in this architecture, the base root component (R07) of the terminal comprises the implementation of the following functions:

Functions comprising level 1 & 2 payment cores (EMV level 1 & 2);

Functions implementing the control of the means for entering information of the payment cardholder (for example the personal identification code "PIN");

the implementations of the cryptographic functions and algorithms necessary for the communication from the terminal to a server (such as the encryption of the identification code "PIN encryption" or point-to-point encryption "P2PE");

Two components for processing of the payment transaction (OTT) are present within the terminal: an online transactional component (CTLp) for payment and a payment standalone transactional type component (CTAp).

The online transactional component (CTLp) for payment implements:

functions for communicating with the server, using the cryptography functions and algorithms necessary for the communication from the terminal to a server (and vice versa);

a function that redirects the functions of the level 1 & 2 payment cores and the means for entering information from the cardholder to the server: it is therefore a function for routing the data managed/generated by the base station (R07), when implementing a payment transaction;

a function for transmitting the transactions already managed by the standalone transactional payment component (OTAp), and previously stored on the terminal.

The payment standalone transactional type component (CTAP) implements:

functions necessary for the local implementation of a payment transaction: the level 3 of the payment core (EMV level 3); these functions use the level 1 & 2 payment core functions and the functions for controlling the cardholder's information entry means for locally managing a payment transaction;

a function for storing the transactions on the terminal;

In this embodiment, the online transactional component (CTLp) for payment is configured (either statically or dynamically) to transmit the data managed/generated by the base station (R07) during the implementation of a payment transaction. This data is transmitted to a transaction processing server. The server in question is an intermediate transactional server (STi), which is the link between the payment terminal (PT) and a transactional server (acquirer) or a traditional banking server (LPS). It is therefore a new type of server which is in charge of implementing only part of the payment transaction. Concretely, this intermediate server implements, in this embodiment:

functions necessary for the completeness of the transaction: the level 3 of the payment core (EMV level 3);

functions necessary for the communication with the transactional server.

As explained previously, the terminal also comprises a component for monitoring (CSN) the state of the communication network(s). This monitoring component (CNS) is permanently or periodically activated and registers, within one or several registers of the secure memory, the state of the communication network(s) accessible through the communication interfaces of the payment terminal (Wifi, 3G/4G/ 5G). When a transaction must be performed, the information contained within these registers allows a launch component (LNCH) to determine which transaction processing component (OTT) is best suited to the situation of the communication network(s). The launch component (LNCH) transmits an instruction to execute the thin client component (LWC) when one of the communication networks is operational; Otherwise, the launch component (LNCH) transmits an instruction to execute the payment standalone transactional type component (CTAp). As indicated previously, the operational network detection may be simple in "all or nothing" mode. It may be richer with an evaluation of the quality of service necessary for the transactions with the intermediate transactional server (STi).

In this embodiment, the payment standalone transactional type component (CTAp) is a reduced functional component. In other words, it is a backup component, used only in the absence of an operational communication network and cannot be used by the payment terminal to conduct a transaction with the intermediate transactional server (STi) or another server.

The payment standalone transactional type component (CTAp)

only contains the functions and configuration options strictly necessary for the certification;

does not contain any function for communicating with the intermediate transactional server (STi), nor with the acquirer;

therefore does not contain any specificity specific to the acquirer;

therefore does not contain the authorization request or PIN transfer functions. The component rejects the transactions requiring these authorization request functions;

does not contain the calls to the cryptography functions necessary for the communication with the intermediate transactional server (STi) or the acquirer;

systematically stores all transactions in a secure memory area of the terminal;

prints transaction receipts directly and without formatting or optional information.

Furthermore, in order to guarantee and maintain the security of the payment terminal, the components for processing the transaction do not share any configuration parameters in common. According to a particular characteristic, to guard against a risk of compromise of one of the transaction processing components by another, different secure memory areas are used to record the execution parameters of the transaction processing components, each component having only the means for obtaining the parameters in the memory area which is intended for it. Thus, process isolation is guaranteed. Indeed, as the use of the payment standalone transactional component (CTAp) constitutes a fallback mode of operation (alternative mode of operation, in a way), it is necessary to prevent this alternative mode of operation from serving as a gateway, for a fraudster, who would like to modify the nominal (normal) operation of the payment terminal, or else to pass a payment transaction that should not be. A fraudster could be tempted to disrupt the communication network(s) present with the aim of ensuring that only the payment standalone transactional component (CTAp) is able to operate and attempt, during this operation in standalone mode, to disrupt the subsequent operation or fraud on the transaction. The isolation of the operating parameters allows preventing this type of attack.

The invention claimed is:

1. A method for processing a transaction using a transactional device of a user, implemented within an electronic transactional terminal, the transactional terminal comprising at least one interface for connecting to at least one communication network and a secure memory space comprising at least a first area and a second area, the method comprising:

a step of determining, from at least one connection interface of the transactional terminal, an availability of at least one communication network and recording, within a secure memory space of the transactional terminal, availability data associated with the at least one communication network;

a step of receiving a command to implement a transaction;

a step of selecting, from among an online transactional component and a standalone transactional component, a transactional component to be activated for implementation of the transaction as a function of the availability data, the standalone transactional component being activated when no communication networks are available; and a step of carrying out the transaction by the activated transactional component, wherein the online transactional component has access to the first area of the secure memory space comprising execution parameters of the online transactional component for implementing the online transactional component functions, and does not have access to the second area of the secure memory space, the standalone transactional component has access to the second area of the secure memory space comprising execution parameters of the standalone transactional component for implementing the standalone transactional component functions which are all different from the online transactional component functions, and does not have access to the first area of the secure memory space, and the method implements a root component, used respectively by the online transactional component and the standalone transactional component, the root component comprising basic functions common to the two transactional components, the functions of the root component being protected and accessible in read-only by the online transactional component and the standalone transactional component.

2. The method for processing a transaction according to claim 1, wherein the step of carrying out the transaction by the activated transactional component comprises, when the online transactional component is implemented:

a step of loading, from the first area of the secure memory space, of the terminal, at least one parameter for implementing the online transactional component;

a step of establishing, with an intermediate transactional server, a secure communication channel, from the at least one parameter and from a secure link construction function available within the root component recorded within the secure memory space of the transactional terminal;

a step of obtaining user data from the user's transactional device;

a step of transmitting, to the intermediate transactional server, through the secure communication channel, the user data;

a step of receiving, from the intermediate transactional server, a result of implementation of the transaction by the intermediate transactional server, the implementation of the transaction having been caused by the transmission of the user data; and a step of restituting, by the transactional terminal, the result of implementation of the transaction by the intermediate transactional server.

3. The method for processing a transaction according to claim 2, wherein it further comprises:

a step of entering, by the user in possession of the transactional device, a personal identification code;

a step of encrypting, from a function for encrypting an authentication code available within the root component, the personal identification code entered by the user; and a step of transmitting, to the intermediate transactional server, through the secure communication channel, the encrypted personal identification code.

4. The method for processing a transaction according to claim 3, wherein it further comprises:

a step of querying the user's transactional device to obtain an additional condition for carrying out the transaction determined by the user's transactional device;

when the additional condition for carrying out the transaction imposes the implementation of an online transaction, a step of rejecting the transaction by the standalone transactional component; and when the additional condition for carrying out the transaction authorizes the implementation of a transaction locally, a step of implementing the transaction.

5. The method for processing a transaction according to claim 1, wherein the step of carrying out the transaction by the activated transactional component comprises, when the standalone transactional component is implemented:

a step of loading, from the second area of the secure memory space, of the terminal, at least one parameter for implementing the standalone transactional component;

a step of obtaining a condition for carrying out the transaction from (i) a transaction management function available within the root component recorded within a secure memory of the terminal and (ii) the at least one parameter;

a step of obtaining user data from the user's transactional device;

when the condition for carrying out the transaction imposes the implementation of an online transaction, a step of rejecting the transaction by the standalone transactional component;

when the condition for carrying out the transaction authorizes the implementation of a transaction locally, a step of implementing the transaction; and a step of restituting, by the transactional terminal, the result of implementation of the transaction.

6. The method for processing a transaction according to claim 1, further comprising, when the at least one communication network availability data indicates that a communication network is available:

a step of establishing, with an intermediate transactional server, a secure communication channel, from at least one parameter and from a secure link construction function available within the root component recorded within a secure memory of the terminal; and a step of transmitting, to the intermediate transactional server, a list of transactions previously carried out through the standalone transactional component.

7. A non-transitory computer-readable medium comprising program code instructions for the execution of a method for processing a transaction according to claim 1, when executed on a computer.

8. A transactional electronic terminal, configured to implement a transaction from a user's transactional device, the transactional electronic terminal comprising:

a secure memory space comprising at least a first area and a second area; and a microprocessor configured to:

determine, from at least one connection interface of the transactional electronic terminal, an availability of at least one communication network and recording, within the secure memory space of the transactional electronic terminal, availability data associated with the at least one communication network;

receive a command to implement a transaction; and select, from among an online transactional component and a standalone transactional component, a transactional component to be activated for implementing the transaction as a function of the availability data, the standalone transactional component being activated when no communication networks are available, wherein the online transactional component has access to the first area of the secure memory space comprising execution parameters of the online transactional component for implementing the online transactional component functions, and does not have access to the second area of the secure memory space, the standalone transactional component has access to the second area of the secure memory space comprising execution parameters of the standalone transactional component for implementing the standalone transactional component functions which are all different from the online transactional component functions, and does not have access to the first area of the secure memory space, and a root component is used respectively by the online transactional component and the standalone transactional component, the root component comprising basic functions common to the two transactional components, the functions of the root component being protected and accessible in read-only by the online transactional component and the standalone transactional component.

9. A system for processing a transaction comprising at least one electronic terminal according to claim 7 connected to an intermediate transactional server through the at least one communication network.

*   *   *   *   *